US012799318B2

(12) United States Patent
Konishi et al.

(10) Patent No.: US 12,799,318 B2
(45) Date of Patent: Nov. 17, 2026

(54) RESIN COMPOSITION AND MOLDED BODY

(71) Applicant: KURARAY CO., LTD., Okayama (JP)

(72) Inventors: Daisuke Konishi, Ibaraki (JP); Hiromitsu Sasaki, Ibaraki (JP); Takumi Hasegawa, Ibaraki (JP)

(73) Assignee: KURARAY CO., LTD., Okayama (JP)

( * ) Notice: Subject to any disclaimer, the term of this patent is extended or adjusted under 35 U.S.C. 154(b) by 573 days.

(21) Appl. No.: 18/281,174

(22) PCT Filed: Mar. 10, 2022

(86) PCT No.: PCT/JP2022/010556
§ 371 (c)(1),
(2) Date: Sep. 8, 2023

(87) PCT Pub. No.: WO2022/191280
PCT Pub. Date: Sep. 15, 2022

(65) Prior Publication Data

US 2024/0218172 A1 Jul. 4, 2024

(30) Foreign Application Priority Data

Mar. 11, 2021 (JP) ................................. 2021-039619

(51) Int. Cl.
*C08L 53/02* (2006.01)
*C08L 31/04* (2006.01)

(52) U.S. Cl.
CPC ............... *C08L 53/02* (2013.01); *C08L 31/04* (2013.01)

(58) Field of Classification Search
CPC ................................ C08L 53/02; C08L 31/04
See application file for complete search history.

(56) References Cited

U.S. PATENT DOCUMENTS

| | | | | |
|---|---|---|---|---|
| 3,830,767 | A | 8/1974 | Condon | |
| 4,006,116 | A | 2/1977 | Dominguez | |
| 7,579,385 | B1 | 8/2009 | Yamakoshi et al. | |
| 2012/0190786 | A1* | 7/2012 | Sasaki | A61J 1/1412 524/505 |
| 2015/0197588 | A1* | 7/2015 | Uehara | C08F 36/22 525/321 |
| 2019/0218389 | A1 | 7/2019 | Senda et al. | |
| 2019/0284362 | A1 | 9/2019 | Morishita et al. | |
| 2020/0283617 | A1 | 9/2020 | Senda et al. | |
| 2020/0362084 | A1 | 11/2020 | Masuda et al. | |

FOREIGN PATENT DOCUMENTS

| | | | | |
|---|---|---|---|---|
| JP | 50-014742 | | 2/1975 | |
| JP | 52-065551 | | 5/1977 | |
| JP | 58-206644 | | 12/1983 | |
| JP | 03-188114 | A | 8/1991 | |
| JP | 08-157547 | | 6/1996 | |
| JP | 2003-047654 | | 2/2003 | |
| JP | 2004-123988 | | 4/2004 | |
| WO | 99/055752 | A1 | 11/1999 | |
| WO | WO-2017073695 | A1 * | 5/2017 | C08L 53/02 |
| WO | 2017/199983 | A1 | 11/2017 | |
| WO | 2019/103047 | A1 | 5/2019 | |
| WO | 2019/103048 | | 5/2019 | |
| WO | 2020/235664 | A1 | 11/2020 | |

OTHER PUBLICATIONS

Translation of WO 2017/073695 (Year: 2017).*
Official communication issued in EP Patent Application No. 22767234.2, Feb. 17, 2025.
ISR issued in International Patent Application No. PCT/JP2022/010556, May 24, 2022, translation.
Written Opinion issued in Int'l Patent Application No. PCT/JP2022/010556, May 24, 2022, translation.

* cited by examiner

*Primary Examiner* — Robert C Boyle
(74) *Attorney, Agent, or Firm* — GREENBLUM & BERNSTEIN, P.L.C.

(57) ABSTRACT

There is provided a resin composition which is excellent in rebound resilience in a wide temperature range of about −5° C. to 55° C. and mechanical strength, and a molded body using the same.

A resin composition containing a block copolymer (A) containing:
- a polymer block (a1) having a structural unit derived from an aromatic vinyl compound; and
- a polymer block (a2) having a structural unit derived from a conjugated diene containing isoprene;
  - in which the block copolymer (A) has a rebound resilience rate of 60% or more at 25° C., and
  - in which a content of the polymer block (a1) in the block copolymer (A) is 5 to 28% by mass.

11 Claims, No Drawings

RESIN COMPOSITION AND MOLDED BODY

TECHNICAL FIELD

The present invention relates to a resin composition which can provide a molded body having an excellent rebound resilience and mechanical strength, and a molded body using the same.

BACKGROUND ART

In general, styrene-based elastomers are sometimes used in applications requiring wear resistance, cold resistance, rebound resilience, mechanical strength, and the like, for example, in applications of household goods, electrical appliance parts, sporting goods, automobile parts, and construction civil engineering components, and the like (for example Patent Literatures 1 to 3).

Among the above applications, sporting goods such as shoe sole materials need to have excellent rebound resilience, therefore, the styrene-based elastomer capable of improving the rebound resilience of the molded body have been extensively studied. For example, in Patent Literature 4, a resin composition containing a mixture of a specific styrene-based thermoplastic elastomer, a hydrocarbon-based rubber softener, and an olefin-based resin, is proposed.

CITATION LIST

Patent Literature

PTL 1: JPS50-14742A
PTL 2: JPS52-65551A
PTL 3: JPS58-206644A
PTL 4: JP2004-123988A

SUMMARY OF INVENTION

Technical Problem

The molded body using the above resin composition have the problem that the material becomes hard at low temperatures of about −5° C. and rebound resilience and the like, which is an index of cushioning properties, deteriorates. In addition, at high temperatures of exceeding 50° C., there is a problem that the material becomes too soft and the rebound resilience and the like deteriorates, therefore the improvement has been desired.

The present invention has been made in view of the conventional problems described above, and an object of the present invention is to provide a a resin composition which is excellent in rebound resilience in a wide temperature range of about −5° C. to 55° C. and mechanical strength, and a molded body using the same.

Solution to Problem

Specifically, the present invention is the following items [1] to [11] as a gist.

[1] A resin composition containing a block copolymer (A) containing: a polymer block (a1) having a structural unit derived from an aromatic vinyl compound; and a polymer block (a2) having a structural unit derived from a conjugated diene containing isoprene; in which the block copolymer (A) has a rebound resilience rate of 60% or more at 25° C., and in which a content of the polymer block (a1) in the block copolymer (A) is 5 to 28% by mass.

[2] The resin composition according to the item [1], in which a rebound resilience rate of the block copolymer (A) at −5° C. is 42% or more.

[3] The resin composition according to the item [1] or [2], in which the polymer block (a2) further has a structural unit derived from butadiene.

[4] The resin composition according to any one of the items [1] to [3], in which the block copolymer (A) is a copolymer hydrogenated by a carbon-carbon double bond of the structural unit derived from a conjugated diene in the block copolymer (A).

[5] The resin composition according to the item [4], in which a hydrogenation rate of the carbon-carbon double bond of the structural unit derived from a conjugated diene in the block copolymer (A) is 85 mol % or more.

[6] The resin composition according to any one of the items [1] to [5], in which a peak top molecular weight of the block copolymer (A) is 5,000 to 800,000.

[7] The resin composition according to any one of the items [1] to [6], further containing an ethylene-vinyl acetate copolymer (B).

[8] The resin composition according to the item [7], in which a mass ratio [(A)/(B)] of the block copolymer (A) with respect to the ethylene-vinyl acetate copolymer (B) is 10/90 to 99/1.

[9] The resin composition according to any one of the items [1] to [8], further containing a plasticizer (C).

[10] The resin composition according to the item [9], in which the plasticizer (C) is contained in an amount of 1 to 300 parts by mass with respect to the 100 parts by mass of the block copolymer (A).

[11] A molded body using the resin composition according to any one of the items [1] to [10].

Advantageous Effects of Invention

According to the present invention, it is possible to provide a resin composition which is excellent in rebound resilience in a wide temperature range of about −5° C. to 55° C. and mechanical strength, and provide a molded body using the same.

DESCRIPTION OF EMBODIMENTS

Hereinafter, it will be explained based on the embodiment of the present invention. Note that, the embodiments shown below are examples to embody the technical concept of the invention, and the invention is not limited to the following description.

In addition, although preferred forms of each embodiment are shown in this description, a combination of two or more individual preferred forms is also a preferred form.

Regarding the items indicated by numerical ranges, when there are several numerical ranges, the lower limit and the upper limit of those ranges can be selectively combined to be a preferred form. Note that the description of the numerical range "XX to YY" means "XX or more and YY or less".

Regarding the numerical range of the temperature, for example, when it is written as "−5° C. to 55° C.", it means "−5° C. to +55° C.", and the "+" symbol is omitted.

[Resin Composition]

The resin composition of the present invention is a resin composition containing a block copolymer (A) containing: a polymer block (a1) having a structural unit derived from an aromatic vinyl compound; and a polymer block (a2) having a structural unit derived from a conjugated diene containing isoprene; in which the block copolymer (A) has a rebound resilience rate of 60% or more at 25° C., and in which a content of the polymer block (a1) in the block copolymer (A) is 5 to 28% by mass.

Hereinafter, the present invention will be explained in detail.

<Block Copolymer (A)>

The block copolymer (A) used in the present invention has a rebound resilience rate of 60% or more at 25° C. In the present invention, by using the block copolymer (A) having a rebound resilience rate of 60% or more at 25° C., it is possible to improve the rebound resilience of a molded body using the resin composition of the present invention. In particular, in the present invention, it is presumed that by adjusting the content of the polymer block (a1) in the block copolymer (A) to a specific range, the block copolymer (A) becomes a microphase-separated structure similar to a sphere, and as a result, the rebound resilience rate will be improved under a wider range of temperature conditions.

From the viewpoint of improving the rebound resilience of a molded body using the resin composition of the present invention, the rebound resilience rate of the block copolymer (A) at 25° C. is preferably 62% or more, more preferably 65% or more, and still more preferably 67% or more. The upper limit may be substantially 100% or 99%.

"The block copolymer (A) having a rebound resilience rate of 60% or more at 25° C." used in the present invention can be produced by setting the content of the polymer block (a1) to 5 to 28% by mass, and further adjusting the combination and the ratio of conjugated dienes constituting the block copolymer (A), and peak top molecular weight as appropriate.

The rebound resilience rate of the block copolymer (A) at −5° C. is preferably 42% or more, more preferably 45% or more, and still more preferably 48% or more. By using the block copolymer (A) in which the rebound resilience rate at −5° C. is equal to or higher than the above lower limit, it is possible to improve the rebound resilience rate at low temperatures of a molded body using the resin composition of the present invention. Note that the upper limit of the rebound resilience rate at −5° C. may be substantially 100% or 99%.

Further, the rebound resilience rate of the block copolymer (A) at 55° C. is preferably 60% or more, more preferably 63% or more, still more preferably 65% or more. By using the block copolymer (A) in which the rebound resilience rate at 55° C. is equal to or higher than the above lower limit, it is possible to improve the rebound resilience rate at high temperatures of the molded body using the resin composition of the present invention. Note that the upper limit of the rebound resilience rate at 55° C. may be substantially 100% or 99%.

In the present invention, the rebound resilience rate of the block copolymer (A) at −5° C., 25° C. and 55° C. refers to a value measured in an atmosphere of −5° C., 25° C. or 55° C. according to ASTM D1054 (ISO4662:2017). Specifically, it can be measured by the method described in Examples.

The block copolymer (A) used in the present invention is the one which contains a polymer block (a1) having a structural unit derived from an aromatic vinyl compound, and a polymeric block (a2) having a structural unit derived from a conjugated diene containing isoprene. The constitution of each polymer block will be described below.

Note that, in the present invention, the block copolymers (A) may be used alone or in combination of two or more.

[Polymer Block (a1)]

The polymer block (a1) is the one which contains a structural unit derived from an aromatic vinyl compound, and the content of the structural unit derived from the aromatic vinyl compound in the polymer block (a1) is preferably 60% by mass or more, more preferably 70% by mass or more, still more preferably 80% by mass or more, even still more preferably 90% by mass or more, and particularly preferably substantially 100% by mass.

As the aromatic vinyl compounds constituting the polymer block (a1), styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, divinylbenzene and the like, are given. These aromatic vinyl compounds may be used alone or in combination of two or more. Among these aromatic vinyl compounds, styrene, α-methylstyrene and 4-methylstyrene are preferable, and styrene is more preferable Note that the polymer block (a1) may contain structural units derived from other monomers such as monomers constituting the polymer block (a2) described later.

In the present invention, the content of the polymer block (a1) in the block copolymer (A) is 5 to 28% by mass. When the content of the polymer block (a1) is less than 5% by mass, the molding processability of the resin composition tends to deteriorate, and when it exceeds 28% by mass, the rebound resilience of the obtained molded body tends to deteriorate. From this viewpoint, the content of the polymer block (a1) in the block copolymer (A) is preferably 7 to 25% by mass, more preferably 10 to 23% by mass, and still more preferably 12 to 21% by mass.

Note that, the content of the structural unit derived from the aromatic vinyl compound in the polymer block (a1) in the present invention is preferably 60% by mass or more, and substantially 100% by mass, as described above.

Here, the content of the polymer block (a1) in the block copolymer (A) can be measured according to the method described in Examples, and specifically, it can be calculated from the value measured by $^{1}$H-NMR.

[Polymer Block (a2)]

The polymer block (a2) contains a structural unit derived from a conjugated diene containing at least isoprene. By containing at least isoprene in the polymer block (a2), it is possible to improve the mechanical strength of the obtained molded body.

As the conjugated diene other than isoprene constituting the polymer block (a2), butadiene, 2,3-dimethyl-butadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, farnesene, chloroprene, and the like are given. These may be used alone or in combination of two or more.

Among these, butadiene, myrcene and farnesene are preferable, butadiene and farnesene are more preferable, and butadiene is still more preferable. That is, the polymer block (a2) in the present invention preferably contains a structural unit derived from butadiene in addition to the structural unit derived from isoprene.

The content of the structural unit derived from the conjugated diene in the polymer block (a2) is preferably 60% by mass or more, more preferably 80% by mass or more, and still more preferably 90% by mass or more, particularly preferably substantially 100% by mass.

The content of the polymer block (a2) in the block copolymer (A) is preferably 72 to 95% by mass, preferably 75 to 93% by mass, more preferably 77 to 90% by mass, still more preferably 79 to 88% by mass. When the content of the polymer block (a2) is at least equal to or higher than the above lower limit, the moldability of the resin composition is improved. Further, when the content of the polymer block (a2) is equal to or less than the above upper limit, it is possible to improve the tensile strength, the elongation at break, and the like while having sufficient flexibility.

The mass ratio [(a1)/(a2)] of the polymer block (a1) and the polymer block (a2) in the block copolymer (A) is preferably 5/95 to 28/72, more preferably 7/93 to 25/75, still more preferably 10/90 to 23/77, and even still more preferably 12/88 to 21/79. When it is within the above range, a resin composition which is excellent in flexibility and has further excellent moldability can be obtained.

[Binding Form]

The block copolymer (A) is a block copolymer containing at least one polymer block (a1) and one polymer block (a2) respectively.

The binding form of the polymer block (a1) and the polymer block (a2) is not particularly limited, and may be linear, branched, radial, or a combination of two or more thereof. Among these, a form in which each block is linearly bound, is preferable.

As the linearly binding form, when the polymer block (a1) is represented by A and the polymer block (a2) is represented by B, the binding forms represented by $(AB)_l$, $A\text{-}(B\text{-}A)_m$, or $B\text{-}(A\text{-}B)_n$ can be exemplified. Note that, the above 1, m and n each independently represent an integer of 1 or more.

When the block copolymer (A) contains at least one polymer block (a1) and at least one polymer block (a2) respectively, it is preferably a triblock copolymer represented by A-B-A, which is a binding form having blocks in the order of the polymer block (a1), the polymer block (a2), the polymer block (a1).

That is, the block copolymer (A) is preferably a triblock copolymer represented by A-B-A. Although the triblock copolymer may be an unhydrogenated product or a hydrogenated product, the hydrogenated product is preferable.

Here, in the present description, when the polymer blocks of the same type are linearly bonded via a divalent coupling agent and the like, the entire bonded polymer blocks are treated as one polymer block. Accordingly, the polymer block which should strictly be written as A-X-A (X represents a coupling agent residue) is represented as A as a whole. In the present description, such type of polymer blocks containing the coupling agent residues are treated as above, so that for example, a block copolymer containing a coupling agent residue, and which should strictly be written as A-B-X-B-A, is represented as A-B-A and is treated as an example of a triblock copolymer.

In addition, the two or more polymer blocks (a1) in the block copolymer (A) may be polymer blocks composed of the same structural units or polymer blocks composed of different structural units. Similarly, when the block copolymer (A) has two or more polymer blocks (a2), each polymer block may be a polymer block composed of the same structural unit, or a polymer block composed of the different structural unit. For example, in the two polymer blocks (a1) in the triblock copolymer represented by A-B-A, the respective aromatic vinyl compounds may be of the same or different types.

[Polymer Block (a3) Constituted by Other Monomers]

In addition to the polymer block (a1) and the polymer block (a2), the block copolymer (A) may contain a polymer block (a3) constituted by other monomers as long as the effect of the present invention is not impaired.

As the other monomers, for example, unsaturated hydrocarbon compounds such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene; functional group-containing unsaturated compounds such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamido-2-methylpropanesulfonic acid, 2-methacrylamide-2-methylpropanesulfonic acid, vinylsulfonic acid, vinyl acetate, and methyl vinyl ether; are given. These may be used alone or in combination of two or more.

When the block copolymer (A) has the other polymer block (a3), the content thereof is preferably 10% by mass or less, more preferably 5% by mass or less.

When the block copolymer (A) contains the polymer block (a3) other than the polymer block (a1) and the polymer block (a2), the total content of the polymer block (a1) and the polymer block (a2) in the block copolymer (A) is preferably 80% by mass or more, more preferably 90% by mass or more, still more preferably 95% by mass or more, and even still more preferably 100% by mass.

[Method of Producing Block Copolymer (A)]

As the the method of producing the block copolymer (A), a method of producing a block copolymer by anionic polymerization is given. Furthermore, when the block copolymer (A) is a hydrogenated block copolymer, it can be suitably produced by a step of hydrogenating the carbon-carbon double bond in the structural unit derived from the conjugated diene in the block copolymer.

(Polymerization Step)

The block copolymer (A) can be produced by a solution polymerization method, or the methods described in JPT2012-502135A and JPT2012-502136A. Among these, the solution polymerization method is preferable, and for example, known methods such as ionic polymerization methods such as anionic polymerization and cationic polymerization, and radical polymerization methods can be applied. Among these, the anionic polymerization method is preferable. As the anionic polymerization method, styrene, isoprene, and optionally a conjugated diene other than isoprene are sequentially added in the presence of a solvent, an anionic polymerization initiator, and optionally a Lewis base to obtain a block copolymer.

As the anionic polymerization initiators, alkali metals such as lithium, sodium and potassium; alkaline earth metals such as beryllium, magnesium, calcium, strontium and barium; lanthanide rare earth metals such as lanthanum and neodymium; compounds containing the above alkali metals, the alkaline earth metals, and the lanthanide rare earth metals; are given. Among these, compounds containing alkali metals and alkaline earth metals are preferable, and organic alkali metal compounds are more preferable.

As the organic alkali metal compounds, organic lithium compounds such as methyllithium, ethyllithium, n-butyllithium, sec-butyllithium, t-butyllithium, hexyllithium, phenyllithium, stilbenelithium, dilithiomethane, dilithionaphthalene, 1,4-dilithiobutane, 1,4-dilithio-2-ethylcyclohexane, and 1,3,5-trilithiobenzene; sodium naphthalene, potassium naphthalene, and the like, are given. Among these, organic lithium compounds are preferable, n-butyllithium and sec-butyllithium are more preferable, and sec-butyllithium is still more preferable. Note that the organic alkali metal compound may be reacted with a secondary amine such as diisopropylamine, dibutylamine, dihexylamine, dibenzylamine, and used as an organic alkali metal amide.

The amount of the organic alkali metal compound used for polymerization varies depending on the molecular weight of the block copolymer (A), but it is usually in a range of 0.01 to 3% by mass with respect to the total amount of monomers constituting the block copolymer (A).

As the solvent, it is not particularly limited as long as it does not adversely affect the anionic polymerization reaction. For example, saturated aliphatic hydrocarbons such as n-pentane, isopentane, n-hexane, n-heptane and isooctane; saturated alicyclic hydrocarbons such as cyclopentane, cyclohexane and methylcyclopentane; aromatic hydrocarbons such as benzene, toluene, and xylene; are given. These may be used alone or in combination of two or more. The amount of the solvent used is not particularly limited.

Lewis bases play a role in controlling the microstructure in the structural units derived from the conjugated dienes. As the Lewis bases, ether compounds such as dibutyl ether, diethyl ether, tetrahydrofuran, dioxane and ethylene glycol diethyl ether; pyridine; tertiary amines such as N,N,N',N'-tetramethylethylenediamine and trimethylamine; alkali metal alkoxides such as potassium t-butoxide; and phosphine compounds, are given. When the Lewis base is used, its amount is preferably in the range of 0.01 to 1,000 molar equivalents per 1 mol of the anionic polymerization initiator.

The temperature of the polymerization reaction is usually in the range of about −80 to 150° C., preferably 0 to 100° C., more preferably 10 to 90° C. The form of the polymerization reaction may be a batch system or a continuous system. The block copolymer (A) can be produced by being continuously or intermittently supplied to the polymerization reaction solution so that each monomer is within a specific range in the polymerization reaction system, or sequentially polymerizing so that each monomer has a specific ratio in the polymerization reaction solution.

The polymerization reaction can be terminated by adding an alcohol such as methanol or isopropanol as a polymerization terminator. The block copolymer can be isolated by pouring the resulting polymerization reaction solution into a poor solvent such as methanol to precipitate the block copolymer, or by washing the polymerization reaction solution with water, separating it, and drying it.

As the preferable embodiment of the block copolymer (A), a structure having a polymer block (a1), a polymer block (a2), and a polymer block (a1) in this order, is given. Therefore, a step of obtaining the block copolymer (A) by producing the polymer block (a1), the polymer block (a2) and the polymer block (a1) in this order, is preferable. In the case of a hydrogenated product, it is more preferable to further produce a hydrogenated block copolymer (A) by a method containing a step of hydrogenating the obtained block copolymer (A).

In the production of the block copolymer (A), a coupling agent can be used from the viewpoint of efficient production.

As the coupling agent, for example, divinylbenzene; polyepoxy compounds such as epoxidized 1,2-polybutadiene, epoxidized soybean oil, tetraglycidyl-1,3-bisaminomethylcyclohexane; halides such as tin tetrachloride, tetrachlorosilane, trichlorosilane, trichloromethylsilane, dichlorodimethylsilane, dibromodimethylsilane; ester compounds such as methyl benzoate, ethyl benzoate, phenyl benzoate, diethyl oxalate, diethyl malonate, diethyl adipate, dimethyl phthalate, and dimethyl terephthalate; carbonate compounds such as dimethyl carbonate, diethyl carbonate, and diphenyl carbonate; alkoxysilane compounds such as diethoxydimethylsilane, trimethoxymethylsilane, triethoxymethylsilane, tetramethoxysilane, tetraethoxysilane, tetrabutoxysilane, tetrakis(2-ethylhexyloxy)silane, bis(triethoxysilyl)ethane, 3-aminopropyltriethoxysilane; 2,4-tolylene diisocyanate and the like, are given.

(Hydrogenation Step)

The block copolymer (A) may be a hydrogenated block copolymer (A) by subjecting the block copolymer obtained by the above method to a step of hydrogenating. That is, the block copolymer (A) is preferably a copolymer in which the carbon-carbon double bond in the structural unit derived from the conjugated diene is hydrogenated.

As the hydrogenation method, known methods can be used. For example, Ziegler-based catalyst; Nickel, platinum, palladium, ruthenium or rhodium metal catalyst supported on carbon, silica, diatomaceous earth or the like; organometallic complexes containing cobalt, nickel, palladium, rhodium or ruthenium metals, are present as a hydrogenation catalyst in a solution in which the block copolymer (A) is dissolved in a solvent that does not affect the hydrogenation reaction, to carry out the hydrogenation reaction.

In the hydrogenation step, a hydrogenation catalyst may be added to the polymerization reaction solution containing the block copolymer obtained by the method for producing the block copolymer (A) described above to carry out a hydrogenation reaction. In the present invention, the hydrogenation catalyst is preferably palladium-carbon in which palladium is supported on carbon.

In the hydrogenation reaction, the hydrogen pressure is preferably 0.1 to 20 MPa, the reaction temperature is preferably 100 to 200° C., and the reaction time is preferably 1 to 20 hours.

The hydrogenation rate of the carbon-carbon double bonds in the structural units derived from the conjugated diene in the block copolymer (A) is preferably 85 mol % or more. When the hydrogenation rate is 85 mol % or more, the weather resistance of the molded body is improved. From this viewpoint, the hydrogenation rate of the carbon-carbon double bond in the structural unit derived from the conjugated diene is more preferably 90 to 99.9 mol %, still more preferably 95 to 99.9 mol %.

The hydrogenation rate can be calculated by measuring $^{1}$H-NMR of the block copolymer (A) before hydrogenation, and the block copolymer (A) after hydrogenation.

Note that the above hydrogenation rate is the hydrogenation rate of carbon-carbon double bonds in all structural units derived from conjugated dienes present in the block copolymer (A).

As the carbon-carbon double bond in the structural unit derived from the conjugated diene present in the block copolymer (A), for example, the carbon-carbon double bond in the structural unit derived from the conjugated diene in the polymer block (a2), is given.

In the present description, the polymer block (a2) in the hydrogenated block copolymer (A) is hydrogenated, however, these are referred to as "polymer block (a2)" in the same manner as before hydrogenation.

In the present invention, an unmodified block copolymer may be used, however a block copolymer modified as follows may also be used.

In the case of the modified block copolymer, the block copolymer may be modified after the hydrogenation step. As the functional groups which can be introduced by modification, for example, amino groups, alkoxysilyl groups, hydroxy groups, epoxy groups, carboxy groups, carbonyl groups, mercapto groups, isocyanate groups, acid anhydride groups, and the like, are given.

As a method of modifying the block copolymer, for example, a method of grafting the hydrogenated block copolymer after isolation using a modifying agent such as maleic anhydride, is given.

In addition, the block copolymer can also be modified before the hydrogenation step. As a specific method, before adding the polymerization terminator, methods of adding coupling agents such as tin tetrachloride, tetrachlorosilane, dichlorodimethylsilane, dimethyldiethoxysilane, tetramethoxysilane, tetraethoxysilane, 3-aminopropyltriethoxysilane, tetraglycidyl-1,3-bisaminomethylcyclohexane and 2,4-tolylene diisocyanate which can react with the polymerization active terminal; polymerization terminal modifiers such as 4,4'-bis(diethylamino)benzophenone and N-vinylpyrrolidone; or other modifiers described in JP2011-132298A; are given.

The position where the functional group is introduced may be the polymerization terminal of the block copolymer or the side chain. Moreover, the above functional groups may be used alone or in combination of two or more. The modifier is preferably in the range of 0.01 to 10 molar equivalents per 1 mol of the anionic polymerization initiator.

[Peak Top Molecular Weight]

The lower limit of the peak top molecular weight (Mp) of the block copolymer (A) is preferably 5,000 or more, more preferably 9,000 or more, still more preferably 15,000 or more, even still more preferably 30,000 or more, and even still more preferably 40,000 or more, from the viewpoint of improving mechanical strength. In addition, the upper limit of the peak top molecular weight (Mp) of the block copolymer (A) is preferably 800,000 or less, more preferably 500,000 or less, still more preferably 300,000 or less, even still more preferably 200,000 or less, and particularly preferably 150,000 or less, from the viewpoint of improving moldability.

The molecular weight distribution (Mw/Mn) of the block copolymer (A) is preferably 1.00 to 4.00, more preferably 1.00 to 3.00, still more preferably 1.00 to 2.00, and even still more preferably 1.00 to 1.50. When the molecular weight distribution is within the above range, the block copolymer (A) has little variation in viscosity, and it is easy to be handled.

Note that the peak top molecular weight (Mp) and molecular weight distribution (Mw/Mn) in this description are the values measured by the method described in Examples described later.

The peak top molecular weight of the polymer block (a1) is preferably 2,000 to 100,000, more preferably 4,000 to 80,000, still more preferably 5,000 to 70,000, and particularly preferably 6,000 to 65,000, from the viewpoint of improving the moldability of the obtained molded body.

The content of the block copolymer (A) in the resin composition of the present invention is preferably 40 to 95% by mass, more preferably 45 to 90% by mass, and still more preferably 50 to 85% by mass. When the content of the block copolymer (A) in the resin composition is within the above range, it becomes easier to obtain a molded body which is excellent in rebound resilience in a wide range of temperatures.

<Ethylene-Vinyl Acetate Copolymer (B)>

The resin composition of the present invention preferably contains an ethylene-vinyl acetate copolymer (B). When the resin composition of the present invention contains the ethylene-vinyl acetate copolymer, the mechanical strength such as the hardness at low temperature, the tensile strength, and the elongation at break of the molded body using the resin composition of the present invention is improved.

The content ratio (VA ratio) of the structural unit derived from vinyl acetate in the ethylene-vinyl acetate copolymer (B) is preferably 5 to 60% by mass, more preferably 5 to 55% by mass, and still more preferably 10 to 50% by mass. When the content ratio of the vinyl acetate-derived structural unit in the ethylene-vinyl acetate copolymer is within the above range, it becomes easier to obtain a molded body having excellent mechanical strength.

The SP value of the ethylene-vinyl acetate copolymer (B) is preferably 4.0 to 10.0 $(cal/cm^3)^{1/2}$, more preferably 5.0 to 9.5 $(cal/cm^3)^{1/2}$, still more preferably 6.0 to 9.0 $(cal/cm^3)^{1/2}$, and even still more preferably 7.0 to 9.0 $(cal/cm^3)^{1/2}$. When the SP value of the ethylene-vinyl acetate copolymer (B) is within the above range, the compatibility with the block copolymer (A) can be easily improved, and the processability of the molded body can be improved.

Note that in the present invention, the SP value (solubility parameter) is calculated based on the estimation method of D. W. Van Krevelen, and the estimation method is calculated based on the cohesive energy density and molar molecular volume (D. W. Van Krevelen, Klaas te Nijenhuis, "Properties of Polymers, Fourth Edition" Elsevier Science, 2009).

The MFR (melt flow rate) of the ethylene-vinyl acetate copolymer (B) at a temperature of 190° C. and a load of 2.16 kg is preferably 0.5 to 20.0 g/10 minutes, more preferably 1.0 to 15.0 g/10 minutes, still more preferably 1.2 to 10.0 g/10 minutes. When the MFR is within the above range, moldability is improved.

In the ethylene-vinyl acetate copolymer (B) used in the present invention, in addition to ethylene and vinyl acetate, copolymers containing vinyl alcohol produced by partially hydrolyzing vinyl acetate can be also included in the ethylene-vinyl acetate copolymer (B) of the present application. A vinyl acetate content ratio in this case is specified by being defined as the total amount of vinyl acetate and vinyl alcohol in the copolymer as the vinyl acetate content ratio.

The content of ethylene-vinyl acetate copolymer (B) in the resin composition of the present invention is preferably from 5 to 60% by mass, more preferably from 10 to 55% by mass, and still more preferably from 15 to 50% by mass. When the content of ethylene-vinyl acetate copolymer (B) in the resin composition is within the above-mentioned range, it becomes easier to obtain a molded body which is excellent in mechanical strength while ensuring moldability.

When the resin composition of the present invention contains the above ethylene-vinyl acetate copolymer (B), the mass ratio [(A)/(B)] of the block copolymer (A) with respect to the ethylene-vinyl acetate copolymer (B) is preferably 10/90 to 99/1, more preferably 20/80 to 95/5, still more preferably 30/70 to 90/10, particularly preferably 50/50 to 85/15, and most preferably 55/45 to 85/15. When it is within the above range, a high rebound resilience rate is exhibited in a wide temperature range.

As the commercial products of ethylene-vinyl acetate copolymer (B) that can be used in the present invention, for example, "EVAFLEX" (trade name, registered trademark) manufactured by Mitsui Dow Polychemicals Corporation, "Ultrasen" (trade name, registered trademark) manufactured by Tosoh Corporation, "UBE Polyethylene (EVA)" (trade name, registered trademark is "UBE polyethylene") manufactured by Ube Maruzen Polyethylene Co., "Suntec-EVA" (trade name, registered trademark) manufactured by Asahi Kasei Chemicals Corporation, "Ethylene-vinyl acetate copolymer NUC" (brand name) manufactured by NUC Corporation, and the like, are given.

<Plasticizer (C)>

The resin composition of the present invention may contain a plasticizer (C), from the viewpoint of moldability and fluidity.

As the plasticizers (C), for example, process oils such as paraffinic, naphthenic and aromatic; oil-based softeners such as mineral oils, and white oils; phthalic acid derivatives such as dioctyl phthalate and dibutyl phthalate; liquid co-oligomers of ethylene and α-olefin; liquid paraffin; polybutene; low molecular weight polyisobutylene; liquid polydienes such as liquid polybutadiene, liquid polyisoprene, liquid polyisoprene/butadiene copolymer, liquid styrene/butadiene copolymer, and liquid styrene/isoprene copolymer; hydrogenated products or modified products thereof, plant-derived oils and the like, are given. The plasticizer (C) may be used alone or in combination of two or more.

Among the above plasticizers, from the viewpoint of compatibility with the block copolymer (A), paraffinic and naphthenic process oils; liquid co-oligomers of ethylene and α-olefin; liquid paraffin; and low molecular weight polyisobutylene are preferable, paraffinic and naphthenic process oils are more preferable, and paraffinic process oils are still more preferable.

When the resin composition of the present invention contains the plasticizer (C), the content of the plasticizer (C) is preferably 1 to 300 parts by mass, more preferably 10 to 250 parts by mass, and particularly preferably 20 to 200 parts by mass, with respect to 100 parts by mass of the block copolymer (A). When the content of the plasticizer (C) is within the above range, the high rebound resilience can be exhibited in a wide temperature range.

<Additive>

In the resin composition of the present invention, other additives and inorganic fillers other than those mentioned above may be added within a range that does not impair the effects of the present invention. As the other additives, for example, thermal anti-aging agents, antioxidants, light stabilizers, antistatic agents, release agents, flame retardants, pigments, dyes, brighteners and the like, are given. These additives may be used alone or in combination of two or more.

When the resin composition of the present invention contains the other additives, the content thereof in the resin composition is preferably 15% by mass or less, more preferably 5% by mass or less, and still more preferably 1% by mass. The content of the other additives can be, for example, 0.01% by mass or more in the resin composition.

<Method of Producing the Resin Composition>.

There are no particular limitations on the method of producing the resin composition of the present invention, and the methods such as feeding each component into, for example, a single screw extruder, a multiple screw extruder, a banbury mixer, a Brabender mixer, a heating roll, various kneaders and the like, and melting and kneading them, are given.

In addition, they may be the methods of feeding the block copolymer (A), ethylene-vinyl acetate copolymer (B) and if necessary other optional components from the separate stocking ports, and melting and kneading them.

The temperature during kneading can be selected as desired, usually in the range of 45° C. to 270° C.

[Molded Body]

The molded body of the present invention is the one which uses the resin composition of the present invention.

The shape of the molded body may be any as long as it can be produced using the resin composition of the present invention. For example, it can be formed into various shapes such as pellets, films, sheets, plates, pipes, tubes, rods and granules. The method of producing this molded body is not particularly limited, and various conventional molding methods, for example, injection molding, blow molding, press molding, extrusion molding, and calender molding and the like, can be used.

<Rebound Resilience Rate of Molded Body>

The rebound resilience rate of the molded body of the present invention at −5° C. is preferably 20% or more, more preferably 25% or more, and still more preferably 30% or more. When the molded body is molded from the resin composition to which the plasticizer (C) is added, the rebound resilience rate at −5° C. is preferably 30% or more, more preferably 35% or more, still more preferably 40% or more.

In addition, the rebound resilience rate of the molded body of the present invention at 25° C. is preferably 40% or more, more preferably 45% or more, and still more preferably 50% or more. When the molded body is molded from the resin composition to which the plasticizer (C) is added, the rebound resilience rate at 25° C. is preferably 50% or more, more preferably 60% or more, still more preferably 68% or more, and even still more preferably 71% or more.

Furthermore, the rebound resilience rate of the molded body of the present invention at 55° C. is preferably 50% or more, more preferably 55% or more, still more preferably 60% or more, and even still more preferably 65% or more.

When the molded body is molded from the resin composition to which the plasticizer (C) is added, the rebound resilience rate at 55° C. is preferably 60% or more, more preferably 70% or more %, and still more preferably 74% or more.

When the above rebound resilience rate is satisfied at each temperature, the molded body of the present invention can be suitably used in fields such as shoe sole materials.

Although the upper limit of the rebound resilience is not particularly limited at any temperature, it may be substantially 100% or 99%.

In the present invention, the rebound resilience rate of the molded body at −5° C., 25° C. and 55° C. refers to the value measured in an atmosphere of −5° C., 25° C. or 55° C. according to ASTM D1054 (ISO4662:2017), and can be specifically measured by the method described in Examples.

<Hardness of Molded Body>

The hardness of the molded body of the present invention is preferably 60 or higher, more preferably 65 or higher, and still more preferably 70 or higher. When the hardness of the molded body of the present invention is equal to or higher than the above lower limit, it can maintain the good hardness even at low temperatures. When the molded body is molded from the resin composition to which the plasticizer (C) is added, it is preferably 70 or smaller, more preferably 50 or smaller, and still more preferably 40 or smaller.

The hardness of the molded body of the present invention refers to the hardness measured by the type A durometer method of JIS K 6253-2:2012, and can be specifically measured by the method described in the Examples.

<Tensile Strength of Molded Body>

The tensile strength of the molded body of the present invention is preferably 20 MPa or more, more preferably 25 MPa or more, and still more preferably 30 MPa or more. When the tensile strength of the molded body of the present invention is equal to or higher than the above lower limit, it can be suitably used for sporting goods such as shoe sole materials. When the molded body is molded from the resin composition to which the plasticizer (C) is added, the tensile strength is preferably 3.0 MPa or more, more preferably 3.5 MPa or more, and still more preferably 4.0 MPa or more.

The tensile strength of the present invention refers to the tensile strength measured according to JIS K 6251:2010, and can be specifically measured by the method described in Examples.

<Elongation at Break of Molded Body>

The elongation at break of the molded body of the present invention is preferably 450% or more, more preferably 480% or more, and still more preferably 500% or more. When the elongation at break of the molded body of the present invention is equal to or higher than the above lower limit, it can be suitably used for sporting goods such as shoe sole materials. When the molded body is molded from the resin composition to which the plasticizer (C) is added, the elongation at break is preferably 600% or more, more preferably 650% or more, and still more preferably 700% or more.

The elongation at break of the present invention refers to the elongation at break measured according to JIS K 6251:2010, and can be specifically measured by the method described in Examples.

<Applications of Molded Body>

The physical properties of the molded body using the resin composition of the present invention are unlikely to deteriorate even at low temperatures, and they can be expected to be excellent in both rebound resilience rate and mechanical strength. Therefore, the resin composition and the molded body of the present invention can be suitably used as the molded products such as sheets, films, tubes, hoses and belts.

More specifically, it can be suitably used for various anti-vibration and damping members such as anti-vibration rubber, mats, sheets, cushions, dampers, pads, mount rubber; footwear such as sports shoes and fashion sandals, more specifically materials for soles of these footwear; household appliance members such as televisions, stereos, vacuum cleaners, and refrigerators; building materials such as sealing packing for building doors and window frames; automotive interior and exterior parts such as bumper parts, body panels, weather strips, grommets, instrument panel skins, airbag covers; grips used in equipment such as drivers, golf clubs, tennis rackets, ski poles, bicycles, motorcycles, fishing gear, sports such as water sports, and fitness; tool and electric tool grips such as hammers, screwdrivers, pliers and wrenches; grips for wet products such as kitchen utensils, toothbrushes, interdental brushes, razors, handrails in bathtubs; grips for writing instruments such as pens and scissors; grips used for automobile interiors and exteriors such as shift levers and assist knobs; bag grips; non-slip mats such as non-slip gloves and kitchen mats; toys; tires such as automobile tires, bicycle tires and motorbike tires.

In addition, it can also be suitably used for food packaging materials such as food wrap films; medical devices such as infusion bags, syringes and catheters; stoppers for containers such as storing foods, beverages, medicines, and cap liners.

EXAMPLES

The present invention will be specifically described below with reference to Examples and Comparative Examples, but the present invention is not limited to these.

Each component used in Examples and Comparative Examples is as follows.

<Block Copolymer (A)>

Block copolymers (A-1) to (A-6) obtained in Production Examples 1 to 6 described below <Block Copolymer (A')>

Block copolymers (A'-1) to (A'-4) obtained in Comparative Production Examples 1 to 4 described later <Ethylene-Vinyl Acetate Copolymer (B)>

EV460 (VA ratio=19% by mass, temperature 190° C., MFR at 2.16 kg load=2.5 g/10 minutes, manufactured by Mitsui-Dow Polychemicals Co., Ltd.), SP value: 8.3 $(cal/cm^3)^{1/2}$ <Plasticizer (C)>

Paraffinic process oil (product name: Diana Process PW-90, manufactured by Idemitsu Kosan Co., Ltd.)

The measurement method for each block copolymer obtained in Production Examples is as follows.

(1) Content of Polymer Block (a1) in Block Copolymer (A)

The copolymer after hydrogenation was dissolved in $CDCl_3$ and subjected to $^1$H-NMR measurement [equipment: "ADVANCE 400 Nano bay" (manufactured by Bruker), measurement temperature: 30° C.], and the content of polymer block (a1) was calculated from the ratio of the peak area derived from styrene and the peak area derived from conjugated diene (isoprene and/or butadiene).

(2) Measurement of Molecular Weight Distribution and Peak Top Molecular Weight (Mp)

The peak top molecular weight (Mp) of the styrene block, the peak top molecular weight (Mp) and the molecular weight distribution (Mw/Mn) of each block copolymer were determined by GPC (gel permeation chromatography) as standard polystyrene equivalent molecular weights. The measuring equipment and conditions are as follows.

Apparatus: GPC apparatus "HLC-8320GPC" manufactured by Tosoh Corporation

Separation column: Column "TSKgelSuperHZ4000" manufactured by Tosoh Corporation

Eluent: tetrahydrofuran

Eluent flow rate: 0.7 mL/min

Sample concentration: 5 mg/10 mL

Column temperature: 40° C.

(3) Measuring Method of Hydrogenation Rate

Each block copolymer before hydrogenation and each block copolymer after hydrogenation were dissolved respectively in $CDCl_3$, and the $^1$H-NMR measurement [Equipment: "ADVANCE 400 Nano bay" (manufactured by Bruker), measurement temperature: 30° C.] was performed.

The hydrogenation rate of the carbon-carbon double bond in the structural unit derived from the conjugated diene in each block copolymer before hydrogenation was calculated from the proton peak of the carbon-carbon double bond which appears at 4.5 to 6.0 ppm in the spectrum obtained using the following formula.

Hydrogenation rate (mol %)={1−(number of moles of carbon-carbon double bonds contained per 1 mol of each block copolymer after hydrogenation)/(number of moles of carbon-carbon double bonds contained per 1 mol of each block copolymer before hydrogenation)}×100

(4) Rebound Resilience Rate of Block Copolymer and Molded Product

The rebound resilience rate of each block copolymer obtained in Production Examples and the rebound resilience rate of the molded body were measured as follows.

First, a sheet of 40 mm×40 mm×5 mm was produced by press molding using each obtained block copolymer, and a test piece with a diameter of 40 mm was produced by punching this sheet. Next, using this test piece, it was measured according to ASTM D1054 (ISO4662:2017).

A test piece was similarly prepared for the molded body and measured by the same method.

(5) Hardness

Dumbbell No. 3 test pieces (2 mm) were obtained from the sheet of each resin composition obtained in Examples and Comparative Examples using a punching blade conforming to JIS K 6251:2010.

Three of the obtained test pieces were stacked and the hardness of 6 mm thickness was measured using a type A durometer indenter in accordance with JIS K 6253-3:2012. Noted that the lower the hardness value, the more excellent the flexibility.

(6) Tensile Strength and Elongation at Break

Using the dumbbell No. 3 test piece (2 mm) prepared in the same manner as the measurement of the hardness, the tensile strength and the elongation at break were measured according to JIS K 6251:2010. The higher the values of the tensile strength and the elongation at break, the better the tensile properties.

<Production of Block Copolymer (A)>

Production Example 1

Block Copolymer (A-1)

50.0 kg of cyclohexane as a solvent and 0.0744 kg of sec-butyllithium (10.5% by mass cyclohexane solution) as an anion polymerization initiator were charged into a nitrogen-purged and dried pressure resistant container the temperature was raised to 50° C. 0.57 kg of styrene (1) was added thereto and polymerized for 1 hour, a mixture of 4.28 kg of isoprene and 3.40 kg of butadiene was added and polymerized for 2 hours, and further 0.57 kg of styrene (2) was added and polymerized for 1 hour, and a reaction liquid containing a polystyrene-poly(butadiene/isoprene)-polystyrene triblock copolymer was obtained.

To the above reaction solution, 5% by mass of palladium carbon (amount of palladium-supported: 5% by mass) with respect to the above block copolymer, was added as a hydrogenation catalyst, and the reaction was carried out under conditions of a hydrogen pressure of 2 MPa and 150° C. for 10 hours. After cooling and releasing the pressure, the hydrogenation catalyst is removed by filtration, the filtrate is concentrated, and further vacuum-dried to obtain a hydrogenated product of polystyrene-poly(butadiene/isoprene)-polystyrene triblock copolymer (block copolymer (A-1)) was obtained.

The above physical properties were measured for the block copolymer (A-1). The results are shown in Table 1.

Production Examples 2 to 3, 5 to 6, Comparative Production Examples 1 to 4

Production of Block Copolymers (A-2) to (A-3), (A-5) to (A-6), (A'-1) to (A'-4)

Block copolymers (A-2) to (A-3), (A-5) to (A-6), (A'-1) to (A'-4) were produced in the same manner as in Production Example 1, except that the raw materials and amounts used were as shown in Table 1.

The above physical properties were measured for the obtained block copolymer. The results are shown in Table 1.

Production Example 4

Production of Block Copolymer (A-4)

The raw materials and their amounts used were as shown in Table 1. After polymerizing styrene (2), 12 g of ethylene oxide was added to obtain a reaction solution containing polystyrene-poly(butadiene/isoprene)-polystyrene triblock copolymer containing terminal hydroxyl groups. The above reaction solution was hydrogenated in the same manner as in Production Example 1 to obtain a hydrogenated product of polystyrene-poly(butadiene/isoprene)-polystyrene triblock copolymer (block copolymer (A-4)).

TABLE 1

| | | | Production Example 1 | Production Example 2 | Production Example 3 | Production Example 4 | Production Example 5 |
|---|---|---|---|---|---|---|---|
| | | | A-1 | A-2 | A-3 | A-4 | A-5 |
| Used amount (kg) | Cyclohexane | | 50.0 | 50.0 | 50.0 | 50.0 | 50.0 |
| | sec-butyllithium (10.5% by mass cyclohexane solution) | | 0.0744 | 0.0840 | 0.0868 | 0.1541 | 0.0432 |
| | Tetrahydrofuran | | — | — | — | — | — |
| | Polymer block (a1) | Stylene (1) | 0.57 | 0.66 | 0.88 | 1.21 | 0.57 |
| | | Stylene (2) | 0.57 | 0.66 | 0.88 | 1.21 | 0.57 |
| | Polymer block (a2) | Butadiene | 3.40 | 3.22 | 3.12 | 2.83 | — |
| | | Isoprene | 4.28 | 4.18 | 3.94 | 3.57 | 7.68 |
| | Ethylene oxide | | — | — | — | 0.012 | — |
| (a1)/(a2)[Mass ratio](*1) | | | 13/87 | 15/85 | 20/80 | 28/72 | 13/87 |
| (a1) Content (% by mass) | | | 13 | 15 | 20 | 28 | 13 |
| Polymer skeleton(*2) | | | St-(Bd/Ip)-St | St-(Bd/Ip)-St | St-(Bd/Ip)-St | St-(Bd/Ip)-St | St-Ip-St |
| Physical property | Peaktop molecular weight (Mp) of polymer block (a1) | | 4,700 | 4,800 | 6,200 | 4,800 | 8,100 |
| | Peaktop molecular weight (Mp) of block copolymer | | 140,000 | 141,000 | 98,000 | 53,300 | 182,000 |
| | Hydrogenation ratio (mol %)(*3) | | 99.0 | 99.1 | 98.9 | 98.0 | 98.7 |
| | Molecular weight distribution (Mw/Mn) | | 1.04 | 1.04 | 1.02 | 1.03 | 1.03 |
| | Rebound resilience (%) (ambient temperature) | −5° C. | 58 | 57 | 56 | 51 | 50 |
| | | 25° C. | 67 | 76 | 69 | 61 | 69 |
| | | 55° C. | 74 | 77 | 69 | 63 | 75 |

TABLE 1-continued

| | | | Production Example 6 | Comparative Production Example 1 | Comparative Production Example 2 | Comparative Production Example 3 | Comparative Production Example 4 |
|---|---|---|---|---|---|---|---|
| | | | A-6 | A'-1 | A'-2 | A'-3 | A'-4 |
| Used amount (kg) | Cyclohexane | | 50.0 | 50.0 | 50.0 | 50.0 | 50.0 |
| | sec-butyllithium (10.5% by mass cyclohexane solution) | | 0.0880 | 0.0984 | 0.1647 | 0.0874 | 0.1028 |
| | Tetrahydrofuran | | — | — | — | — | 0.073 |
| | Polymer block (a1) | Stylene (1) | 0.79 | 1.32 | 1.32 | 2.87 | 1.32 |
| | | Stylene (2) | 0.79 | 1.32 | 1.32 | 2.87 | 1.32 |
| | Polymer block (a2) | Butadiene | — | 2.73 | — | — | 6.18 |
| | | Isoprene | 7.24 | 3.44 | 6.18 | 3.09 | — |
| | Ethylene oxide | | — | — | — | — | — |
| (a1)/(a2)[Mass ratio](*1) | | | 18/82 | 30/70 | 30/70 | 60/40 | 30/70 |
| (a1) Content (% by mass) | | | 18 | 30 | 30 | 60 | 30 |
| Polymer skeleton(*2) | | | St-Ip-St | St-(Bd/Ip)-St | St-Ip-St | St-Bd-St | St-Bd-St |
| Physical property | Peaktop molecular weight (Mp) of polymer block (a1) | | 5,500 | 8,200 | 4,900 | 25,400 | 7,850 |
| | Peaktop molecular weight (Mp) of block copolymer | | 87,600 | 82,400 | 44,800 | 111,600 | 86,200 |
| | Hydrogenation ratio (mol %)(*3) | | 99.0 | 99.1 | 98.5 | 97.7 | 98.3 |
| | Molecular weight distribution (Mw/Mn) | | 1.03 | 1.04 | 1.03 | 1.12 | 1.07 |
| | Rebound resilience (%) (ambient temperature) | −5° C. | 44 | 47 | 40 | 28 | 37 |
| | | 25° C. | 64 | 52 | 56 | 24 | 48 |
| | | 55° C. | 69 | 53 | 61 | 27 | 48 |

Note that each notation in Table 1 is as follows.

(*1)[(a1)/(a2)]:

It represents the mass ratio of the content of the polymer block (a1) with respect to the content of the polymer block (a2).

(*2)Polymer skeleton

St-(Bd/Ip)-St represents a polystyrene-poly(butadiene/isoprene)-polystyrene triblock copolymer.

St-Ip-St represents a polystyrene-polyisoprene-polystyrene triblock copolymer.

St-Bd-St represents a polystyrene-polybutadiene-polystyrene triblock copolymer.

(*3)The hydrogenation rate represents the hydrogenation rate of the carbon-carbon double bond in structural unit derived from the conjugated diene in the block copolymers (A-1) to (A-6) and (A'-1) to (A'-4).

Examples 1 to 9, Comparative Examples 1 to 4

Block copolymer (A), block copolymer (A') and ethylene-vinyl acetate copolymer (B) were fed into a Brabender (Brabender's Plastograph EC 50 cc mixer) in the blending shown in Tables 2 and 3, and melt-kneaded for 3 minutes at a cylinder temperature of 200° C. and screw speed of 60 rpm, and then, extruded into strands shape and cut to obtain a resin composition. The obtained resin compositions were evaluated as described above. The results are shown in Tables 2 and 3.

TABLE 2

| | | | Example | | | | | | | | |
|---|---|---|---|---|---|---|---|---|---|---|---|
| | | | 1 | 2 | 3 | 4 | 5 | 6 | 7 | 8 | 9 |
| Blending of resin composition (parts by mass) | Block copolymer (A) | (A-1) | 70 | | | | | | | | |
| | | (A-2) | | 70 | | | | | | | |
| | | (A-3) | | | 70 | | | | 50 | 80 | |
| | | (A-4) | | | | 70 | | | | | |
| | | (A-5) | | | | | 70 | | | | |
| | | (A-6) | | | | | | 70 | | | 80 |
| | Block copolymer (A') | (A'-1) | | | | | | | | | |
| | | (A'-2) | | | | | | | | | |
| | | (A'-3) | | | | | | | | | |
| | | (A'-4) | | | | | | | | | |
| | Ethylene-vinyl acetate copolymer (B) | | 30 | 30 | 30 | 30 | 30 | 30 | 50 | 20 | 20 |
| | Content of polymer block (a1) (% by mass) in the block copolymer (A) | | 13 | 15 | 20 | 28 | 13 | 18 | 20 | 20 | 18 |
| | Polymer skeleton of block copolymer (A) | | St-(Bd/Ip)-St | St-(Bd/Ip)-St | St-(Bd/Ip)-St | St-(Bd/Ip)-St | St-Ip-St | St-Ip-St | St-(Bd/Ip)-St | St-(Bd/Ip)-St | St-Ip-St |
| Physical property | Rebound resilience (%) | −5° C. | 39 | 39 | 39 | 39 | 37 | 34 | 31 | 42 | 36 |
| | | 25° C. | 54 | 62 | 56 | 51 | 55 | 52 | 49 | 56 | 52 |
| | | 55° C. | 65 | 68 | 61 | 56 | 64 | 57 | 56 | 62 | 56 |
| | Hardness | Type A | 77 | 78 | 80 | 83 | 69 | 77 | 74 | 69 | 66 |
| | Tensile strength | MPa | 37 | 38 | 40 | 40 | 30 | 36 | 33 | 27 | 24 |
| | Elongation at break | % | 540 | 520 | 490 | 580 | 780 | 670 | 500 | 510 | 690 |

TABLE 3

| | | | Comparative Example | | | |
|---|---|---|---|---|---|---|
| | | | 1 | 2 | 3 | 4 |
| Blending of resin composition (parts by mass) | Block copolymer (A) | (A-1) | | | | |
| | | (A-2) | | | | |
| | | (A-3) | | | | |
| | | (A-4) | | | | |
| | | (A-5) | | | | |
| | | (A-6) | | | | |
| | Block copolymer (A') | (A'-1) | 70 | | | |
| | | (A'-2) | | 70 | | |
| | | (A'-3) | | | 70 | |
| | | (A'-4) | | | | 70 |
| | Ethylene-vinyl acetate Copolymer (B) | | 30 | 30 | 30 | 30 |
| | Content of polymer block (a1) (% by mass) in the block copolymer (A) | | 30 | 30 | 60 | 30 |
| | Polymer skeleton of block copolymer (A). | | St-(Bd/Ip)-St | St-Ip-St | St-Bd-St | St-Bd-St |
| Physical property | Rebound resilience(%) | −5° C. | 34 | 33 | 29 | 32 |
| | | 25° C. | 47 | 50 | 33 | 46 |
| | | 55° C. | 52 | 56 | 32 | 50 |
| | Hardness | Type A | 84 | 82 | 98 | 87 |
| | Tensile strength | MPa | 43 | 26 | 32 | 45 |
| | Elongation at break | % | 530 | 680 | 640 | 590 |

Examples 10 to 12, Comparative Examples 5 to 6

Block copolymer (A), block copolymer (A') and and plasticizer (C) were fed into a Brabender (Brabender's Plastograph EC 50 cc mixer) in the blending shown in Table 4, and melt-kneaded for 3 minutes at a cylinder temperature of 200° C. and screw speed of 60 rpm, and then, extruded into strands shape and cut to obtain a resin composition. The obtained resin compositions were evaluated as described above. The results are shown in Table 4.

TABLE 4

| | | | Example | | | Comparative Example | |
|---|---|---|---|---|---|---|---|
| | | | 10 | 11 | 12 | 5 | 6 |
| Blending of resin composition (parts by mass) | Block copolymer (A) | (A-3) | | 100 | 100 | | |
| | | (A-6) | 100 | | | | |
| | Block copolymer (A') | (A'-1) | | | | 100 | 100 |
| | Plasticizer (C) | | 70 | 120 | 100 | 100 | 70 |
| Physical property | Rebound resilience (%) | −5° C. | 43 | 43 | 46 | 40 | 45 |
| | | 25° C. | 75 | 64 | 70 | 70 | 64 |
| | | 55° C. | 75 | 76 | 77 | 72 | 69 |
| | Hardness | Type A | 31 | 28 | 30 | 28 | 46 |
| | Tensile strength | MPa | 4.3 | 6.0 | 7.7 | 9.3 | 18 |
| | Elongation at break | % | 710 | 880 | 790 | 960 | 950 |

As is obvious from the results shown in Tables 2 to 4, the molded body using the resin composition of the present invention is excellent in rebound resilience in a wide temperature range of about −5° C. to 55° C.

The invention claimed is:

1. A resin composition comprising a block copolymer (A) containing:

a polymer block (a1) having a structural unit derived from an aromatic vinyl compound; and a polymer block (a2) having a structural unit derived from a conjugated diene containing isoprene;

wherein the block copolymer (A) has a rebound resilience rate of 60% or more at 25° C., and wherein a content of the polymer block (a1) in the block copolymer (A) is 5 to 28% by mass.

2. The resin composition according to claim 1, wherein a rebound resilience rate of the block copolymer (A) at −5° C. is 42% or more.

3. The resin composition according to claim 1, wherein the polymer block (a2) further has a structural unit derived from butadiene.

4. The resin composition according to claim 1, wherein the a carbon-carbon double bond of the polymer block (a2) having the structural unit derived from a conjugated diene is hydrogenated.

5. The resin composition according to claim 4, wherein a hydrogenation rate of the carbon-carbon double bond of the polymer block (a2) having the structural unit derived from a conjugated diene is 85 mol % or more.

6. The resin composition according to claim 1, wherein a peak top molecular weight of the block copolymer (A) is 5,000 to 800,000.

7. The resin composition according to claim 1, further comprising an ethylene-vinyl acetate copolymer (B).

8. The resin composition according to claim 7, wherein a mass ratio [(A)/(B)] of the block copolymer (A) with respect to the ethylene-vinyl acetate copolymer (B) is 10/90 to 99/1.

9. The resin composition according to claim 1, further comprising a plasticizer (C).

10. The resin composition according to claim 9, wherein the plasticizer (C) is contained in an amount of 1 to 300 parts by mass with respect to the 100 parts by mass of the block copolymer (A).

11. A molded body using the resin composition according to claim 1.

* * * * *